United States Patent [19]
Ogihara et al.

[11] 3,852,785
[45] Dec. 3, 1974

[54] SELF-TIMER FOR A CAMERA

[75] Inventors: Masuo Ogihara, Chiba; Tomoo Yonemoto, Funabashi, both of Japan

[73] Assignee: Seiko Koki Kabushiki Kaisha, Tokyo, Japan

[22] Filed: Mar. 20, 1974

[21] Appl. No.: 453,085

[30] Foreign Application Priority Data
Mar. 31, 1973  Japan................................ 48-38256

[52] U.S. Cl............................... 354/239, 354/267
[51] Int. Cl......................... G03b 9/64, G03b 17/40
[58] Field of Search ............ 354/237, 239, 266, 267

[56] References Cited
UNITED STATES PATENTS
3,625,128  12/1971  Nomura......................... 354/237 X
3,713,373  1/1973  Sato..................................... 354/239

*Primary Examiner*—Joseph F. Peters, Jr.
*Attorney, Agent, or Firm*—Robert E. Burns; Emmanuel J. Lobato; Bruce L. Adams

[57] ABSTRACT

A timer in a camera having a depressable camera release plate having a pivoted camera release lever that actuates a shutter release lever when the depressable release plate is depressed for taking exposures. The timer provides for timed exposures and comprises a governor which is manually charged. The governor has a gear that is driven when the governor is charged to actuate an interlocking lever transported on a self-release lever biased to a raised position in which the interlocking lever cams the camera release lever clear of the path of the shutter release lever as the release plate is depressed. The charging of the governor manually automatically sets the timer for a timed exposure and a locking lever actuated by the interlocking lever when at its raised position locks the governor. When the release plate is depressed the interlocking lever effects release of the governor and the movement of the governor causes the gear to move the self-release plate downwardly so that it actuates the shutter release lever.

3 Claims, 5 Drawing Figures

SELF-TIMER FOR A CAMERA

BACKGROUND OF THE INVENTION

This invention relates generally to cameras and more particularly to a self-timer for cameras.

In conventional camera self-timers the self-timer is charged or wound manually. In order to retain the charged state a pawl or the like maintains the charged state. The mechanism maintaining the charged state is generally complicated in structure and costly to manufacture. Furthermore, they require considerable space and cannot be made very compact.

SUMMARY OF THE INVENTION

It is a principal object of the present invention to provide an inexpensive and compact, uncomplicated self-timer for a camera.

The self-timer has a governor that is charged manually and in being charged actuates a self-release lever to a raised position in which an interlocking lever pivoted thereon and transported thereby is moved to a raised position in which it lies in the path of a shutter release lever pivoted on and transported by a depressable camera release plate to cam it clear of a shutter release lever so that an exposure is not taken upon depression of the release plate. Moreover it locks the release plate in its depressed position so that a delayed exposure is taken under control of the governor which is released by a braking lever controlled by the interlocking lever. As the governor actuates it moves the self-release plate downwardly which engages the shutter release lever and takes the exposure and conditions are restored for taking a next exposure without the use of the governor. The governor is placed in use each time only when it is charged manually.

BRIEF DESCRIPTION OF THE DRAWINGS

Other objects and advantages will appear from the following description of an example of the invention, and the novel features will be particularly pointed out in the appended claims and drawings in which:

DESCRIPTION OF PREFERRED EMBODIMENT

Figure 1:
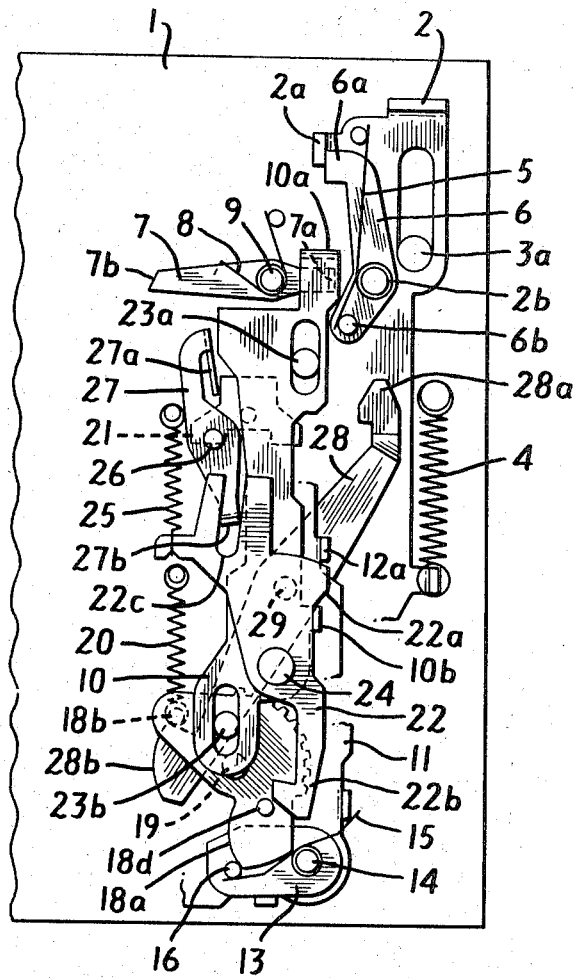
FIG. 1 is a plan view of a self-timer according to the invention.

As shown in FIGS. 1-5 the shutter and self-timer according to the invention comprises a base plate 1 mounting the shutter and the self-timer. A release plate 2 is reciprocable on the base plate guided by fixed pins 3a, 3b received in elongated slots on the release plate. The release plate 2 is biased upwardly to a rest position by a spring 4 to which it is restored after a photographic exposure has been taken. The release lever has a projection 2a normal to the plane of the drawing and has a pivot 2b for a release lever 6 biased in a counterclockwise direction by a spring 5.

The release lever 6 has a projection 6a on one end and a pin 6b on the other end. This projection 2a bears against the projection 2a of the release plate 2. A shutter release lever 7 is mounted on the base plate biased and in a counterclockwise direction by a spring 8 about a fixed pivot 9. An end 7b cooperates with the shutter, not shown, while the other end can relate with the projection 6a of the release lever when the self-timer is not used and has a projection 7a normal to the plane of the drawing in FIG. 1. This projection 7a cooperates with a normal projection 10a of a self-release plate 10. A lower base plate 11 of the self-timer supports a series of wheels of the self-timer in conjunction with an upper base plate 12. See FIG. 5. An intermediate lever 13 is pivoted on a pivot 14 and is biased in a clockwise direction by a spring 15 and is supported rotatably by the upper and lower base plates 11, 12. A self-setting lever 17 is fixed to the pivot or shaft 14.

A fan-shaped gear wheel 18 is rotatably supported by the upper and lower base plates 11, 12 on a shaft 19. The gear wheel 18 is biased in a clockwise direction by a spring 20 connected to a pin 18b. The fan-shaped gear wheel 18 has a cam part 18a which cooperates with the pin 16 of the intermediate lever 13 and a pin 18d of an interlocking plate 22. A toothed sector or part 18c is provided on the fan-shaped gear wheel 18. The toothed part 18c is connected to an anchor 21 through a well known series of gears, not shown.

The self-release plate 10 provided is movable up and down guided by guide pins 23a, 23b received in elongated slots and fixed on the upper base plate. The self-release plate is provided with an interlocking plate 22 rotating about a pivot 24. The projection or tab 10b checks the clockwise rotation of the interlocking plate imparted by a spring 25. The self-release plate 10 is always imparted on upward force from the interlocking plate 22 by its biasing spring 25 through the shaft 24. The upward movement is determined by a projection 22a of the interlocking plate 22 cooperating with a projection 12a both projections extend normal to a plane of the drawing in FIG. 1, provided on the upper base plate. The interlocking plate 22 has a groove 22c that receives a second upstanding tab or projection 27b provided on an end of a braking lever 27 pivoted on a pivot or pin 26 fixed on the upper base plate 12. The braking lever has a first upstanding tab or projection 27a capable of cooperating with the anchor 21 and pivots about a pivot 26 fixed on the upper base plate 12. The interlocking plate 22 has a hook projection 22b that can bear on a pin 18d of the fan-shaped gear wheel.

Figure 4:
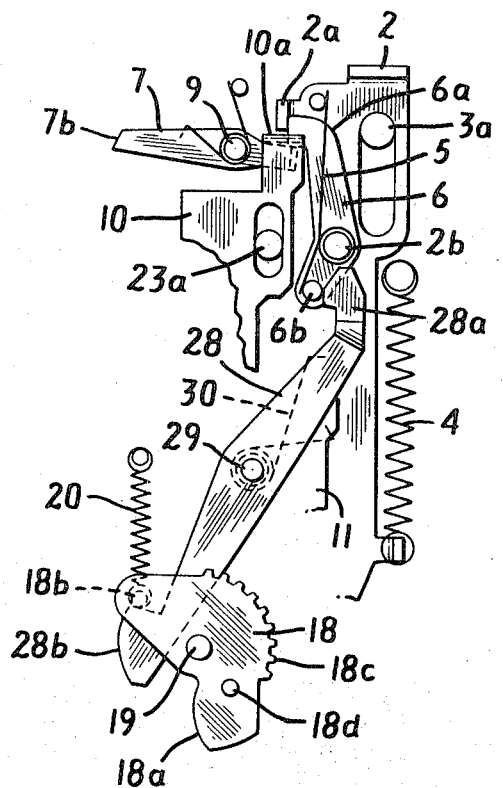
FIG. 4 is a fragmentary plan view of a final state of the self-timer in FIG. 1.
Figure 5:
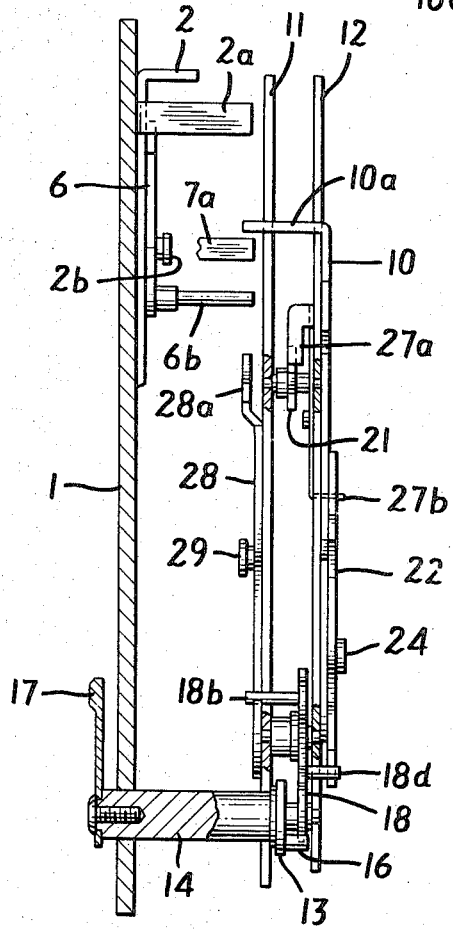
FIG. 5 is a cross section view of the self-timer of FIG. 1.

A lock lever 28 is pivoted on a pivot 29 fixed to the lower base plate 11 and is biased in a clockwise direction by a spring 30, see FIG. 4. This lock lever 28 is provided with a lock part 28a engageable with the pin 6b of the release lever 6 and has a cam part 28b cooperative with the pin 18b on the fan-shaped gear wheel 18.

OPERATION

FIG. 1 illustrates the self-timer at a standstill wherein the fan-shaped gear wheel 18 is at a stop position. The operation when the self-timer is not used will first be described. The lock part 28a of the lock lever 28 has its cam part 28b engaged with the pin 18b. When the release plate 2 is depressed to take a photographic exposure the lock part 28a of the lock lever is outside of the path of travel of the pin 6b of the release lever carried on the release plate 2. Therefore, as the release plate 2 is depressed the pin 6b travels along a path along a side of the lock part 28a of the lock lever and as the release plate continues to be depressed the projection 6a of the release lever 6 pushes the upstanding projection 7a of the shutter release lever 7 making the shutter release lever 7 rotate clockwise to perform an exposure by the shutter, not shown, according to a well known method. After the exposure the release plate is manually released and it is restored to its upper or rest position by its biasing or restoration spring 4.

Next the use of the self-timer is described. To charge the self-timer the set lever 17 is rotated and the intermediate lever 13 is rotated in a clockwise direction from the state shown in FIG. 1 to the state shown in FIG. 2. The rotation force thereof makes the fan-shaped gear wheel rotate counterclockwise through the pin 16 and the cam part 18a of the fan-shaped gear wheel. When the fan-shaped gear wheel 18 begins to rotate counterclockwise, since the pin 18b fixed to the fan-shaped gear wheel also rotates counterclockwise simultaneously, the spring 20 is tensioned in the initial stage of the rotation. The lock lever 28 rotates counterclockwise through its cam part 28b. When the lock lever 28 is rotated to the state shown in FIG. 2 the lock part 28a provided at the other end is set in the path of the pin 6b of the release lever 6. On the other hand the pin 18d on the gear wheel 18 also rotates to engage with the second projection 22b of the interlocking plate 22, then by further rotation causes the interlocking plate 22 to rotate in a counterclockwise direction against the force of its own spring 25 and the braking plate 27 engaging with the groove 22c of the interlocking plate is rotated simultaneously, and the other end 27a thereof fits with the anchor 21 braking the rotation of the series of wheels.

Figure 2:
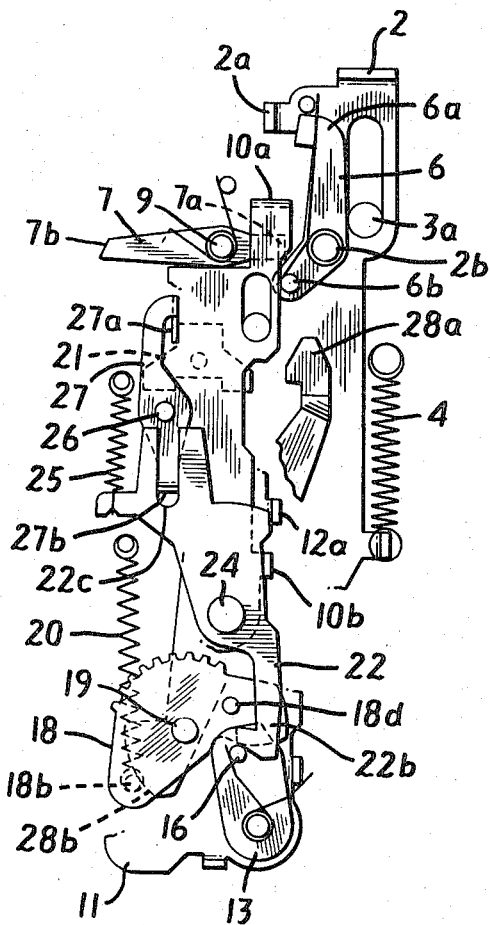
FIG. 2 is a fragmentary plan view of the self-timer in FIG. 1 in a charged state.
Figure 3:
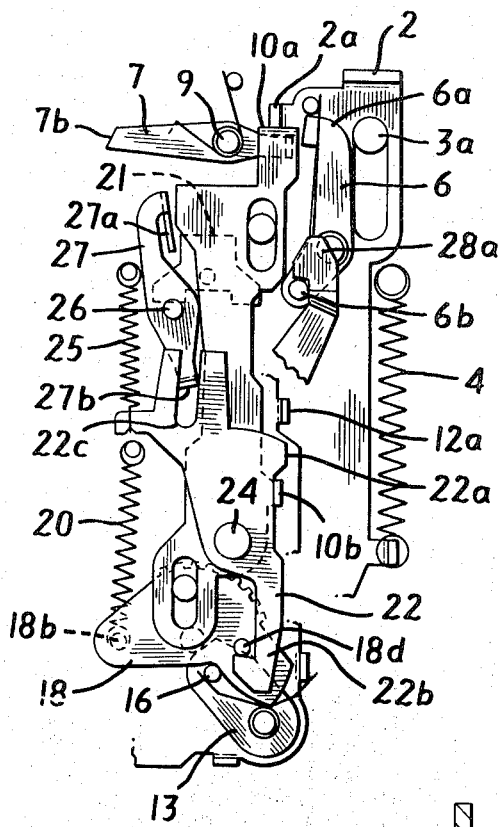
FIG. 3 is a fragmentary plan view of an active state of the self-timer in FIG. 1.

At almost the same time with this action the engagement of the first projection 22a with the projection or tab 12a is released and the self-release plate 10 displaces upwardly together with the interlocking plate 22 by the force of the spring 25 to assume the state shown in FIG. 2.

The fan-shaped gear wheel 18 is further rotated in the direction of charging, but since the anchor 21 has been arrested already, the anchor does not move; however, since as is well known, a clutching connection that allows rotation in one direction only is made in the series of wheels, the fan-shaped gear wheel 18 is rotated counterclockwise further and the pin 18d is shifted up to the position where it is engaged with the second projection 22b of the interlocking plate 22, thereby the charging of the self-timer is finished, assuming the state of FIG. 2.

When the release plate 2 is pressed down from this state, the pin 6b of the release lever 6 mounted on the release plate strikes against the end of the lock part 28a of the lock lever 28 and is made to rotate clockwise. Since by this rotation the projection 6a of the release lever 6 escapes outside the path of the tab 7a of the shutter release lever 7, the release lever never releases the shutter.

When the release lever 2 is pressed down further, the pin 6b of the release lever falls into the hooking part of the lock part of the lock lever, and prevents the release plate 2 from returning upwardly. On the other hand, in the course of pressing down of the release plate, the projection 2a of the release part fits with the downward projection part 10a of the self-release plate 10 making the self-release plate shift downward further. Simultaneously with this shift of the self-release plate, the interlocking plate 22 provided therewith shifts, too, but since in this shifting the side face of the first projection 22a of the interlocking plate shifts along the side face of the tab or projection part of the upper base plate, the interlocking plate 22 does not displace in the direction of rotation while the both parts are engaged so that the braking plate 27 engaging with the groove 22c does not displace and continues to arrest the anchor 21.

And when the release plate 2 is pressed down further, since the engagement between the first projection 22a of the interlocking plate and the projection 12a of the upper base plate 12 is released, the interlocking plate 22 rotates clockwise by the force of its own spring 25, and the second projection 22a enters into the path of the pin 18d of the fan-shaped gear wheel 18, and at the same time the groove 22c pushes the projection 27b of the braking plate to make the braking plate rotate counterclockwise to release the arrest of the anchor 21 resulting in starting the rotation of the fan-shaped gear wheel and the series of wheels, not shown, by the force of the spring 20. When the fan-shaped gear wheel 18 rotates by a certain angle, the pin 18d fits with the hooking part on the second projection 22b of the interlocking plate 22, making the interlocking plate 22 start to shift downward against the force of its spring 25, and at the same time the self-release plate 10 also begins to shift downwardly to assume the state shown in FIG. 3. From this state the rotation of the fan-shaped gear wheel 18 advances to make the self-release plate 10 be pressed down further, then the downward projection thereof fits with the tab 7a of the shutter release lever 7 to rotate the shutter release lever 7 clockwise, thereby the shutter is released to perform an exposure action. At this time, since the cam 28b of the lock lever 28 is being pushed-in by the pin 18b, the lock part 28a thereof still locks the pin 6b of the release lever, so that the release plate 2 does not return upwardly.

After releasing the shutter in this way, when the fan-shaped gear wheel 18 rotates for a definite time, since the pin 18d of the fan-shaped gear wheel escapes outside of the path of the second projection 22b of the interlocking plate to release the constraint of the interlocking plate 22 and the self-release plate 10, the interlocking plate returns by the force of its own spring 25 until the upper face of the first projection 22a of the interlocking plate strikes against the projection 12a of the upper base plate. Thereafter when the fan-shaped gear wheel rotates further, since the pin 18b shifts to the escape portion of the cam part 28b of the lock lever 28, the lock lever 28 rotates clockwise by the force of its own spring 30 to release the constraint of the pin 6b of the release lever, then the release plate 2 and the release lever 6 return to their original positions, by the force of the spring 4, assuming the state shown in FIG. 1.

What we claim and desire to secure by letters patent:

1. A self-timer for a camera having a depressable release plate having a camera release lever pivoted thereon and a shutter release lever actuated by said release lever when the depressable plate is depressed, the self-timer comprising, a self-release plate actuatable longitudinally, an interlocking lever pivotally mounted on the self-release plate, a governor having a rotatable gear for charging the governor, means for rotating the gear to charge the governor, a braking lever actuated by said interlocking lever for releasably locking said governor and for unlocking the governor, said gear having means for initiating movement of said self-release plate for transporting the interlocking lever to a position for camming the camera release lever out of the path of the shutter release lever when the depressable release plate is depressed when the governor is cocked for timed exposures, said interlocking lever having means releasing the governor when said depressable release plate is depressed and said interlocking lever is in said position, said governor having means restoring the self-release plate to a rest position when released by said braking lever, and said self-release plate having means actuating the shutter release lever when said governor restores it to said rest position.

2. A self-timer for a camera according to claim 1, in which said governor comprises an anchor actuated by said braking lever.

3. A self-timer for a camera according to claim 1, in which said interlocking lever is disposed in a position clear of the camera release lever when the governor is not charged to allow the camera release lever to engage the shutter release lever when the camera depressable release plate is depressed.

* * * * *